Dec. 29, 1931.  W. H. ROSE  1,838,156
SUSPENDING DEVICE
Filed Sept. 6, 1930
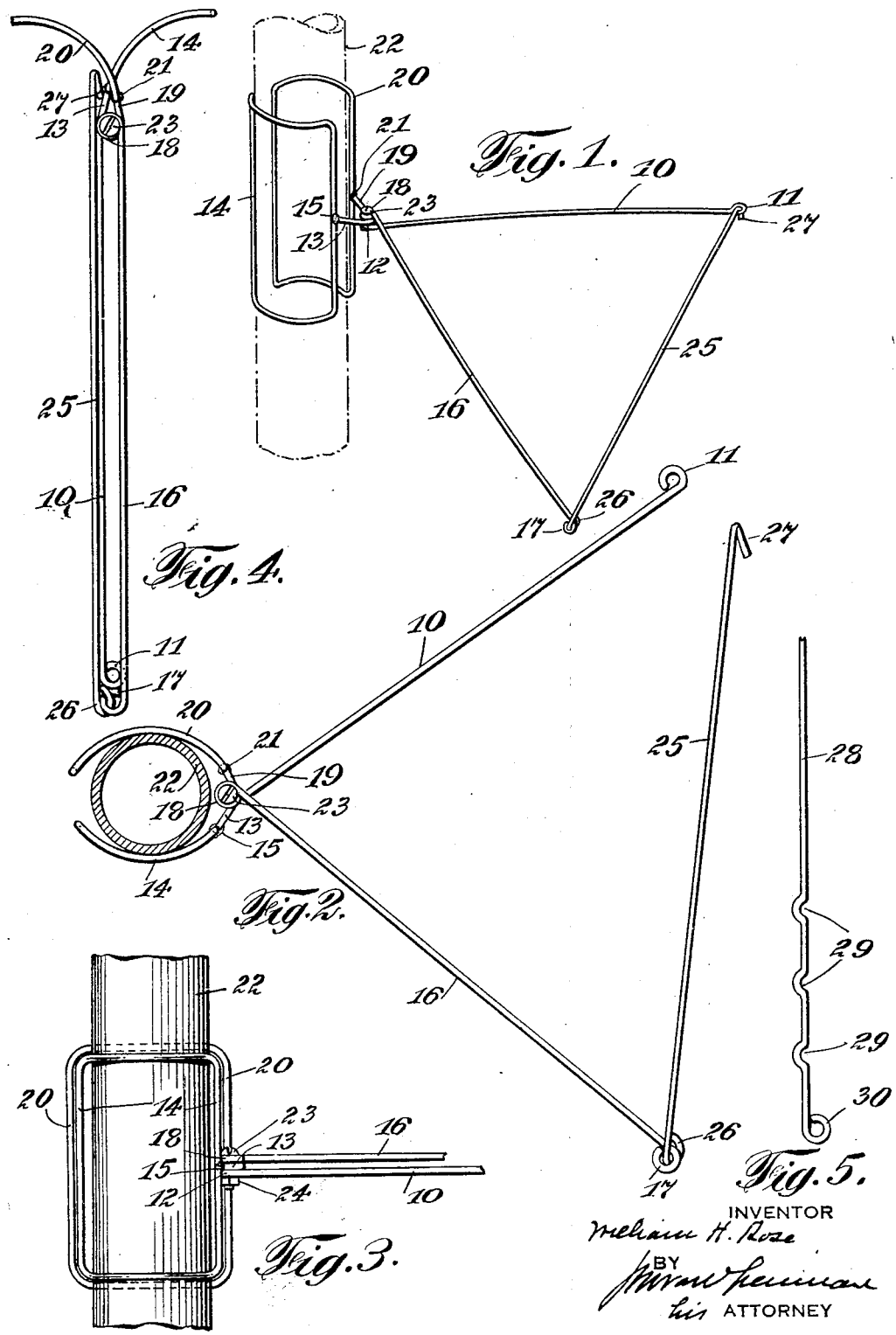
INVENTOR
William H. Rose
BY
[signature]
his ATTORNEY Patented Dec. 29, 1931

1,838,156

UNITED STATES PATENT OFFICE

WILLIAM H. ROSE, OF JERSEY CITY, NEW JERSEY

SUSPENDING DEVICE

Application filed September 6, 1930. Serial No. 480,070.

My invention relates to suspending devices and refers particularly to devices of this character suitable for suspending wearing apparel especially for purposes of drying the same.

It is frequently desirable to dry small articles of wearing apparel in rooms or apartments not permanently equipped for this purpose, and hence considerable inconvenience is experienced in accomplishing this object.

The device of my invention presents a simple, convenient and inexpensive means whereby the drying of articles of this character can be readily accomplished.

In addition to the above described properties of my device, it possesses the additional value of being able to take advantage of the heat radiating from radiators and heating pipes, which can be employed as a means for supporting my device during its employment.

My device comprises broadly, a pair of pivotally connected members capable of placement around a support, and attached thereto through the medium of one of the elements of the device which is so constructed that when it is attached to both of the pivotal members it causes them to grip the support.

The novelty and advantages of my device will be evident upon a consideration of my specification and its accompanying illustrations, in which similar parts are designated by similar numerals.

Figure 1 is a perspective view of one form of my device attached to a pipe.

Figure 2 is a top plan view of the device shown in Figure 1 in unattached position.

Figure 3 is an enlarged fragmentary view of Figure 1 showing the support grips attached to a pipe.

Figure 4 is a side view of the device in folded position.

Figure 5 is a view of a modified form of one of the members to which the fastening member may be attached.

The particular form of the device of my invention shown in the accompanying drawings comprises three pieces of wire formed and combined as follows:—

The member 10 has its one extremity bent into a loop 11, the member 10 being extended into the coiled loop 12, thence outwardly 13, and is then formed into the arc-shaped parallelogram support-grip 14, the free end of the wire 10 being fastened at 15 by any suitable means.

The member 16 has its one extremity bent into a loop 17, the member 16 being extended into the coiled loop 18, then outwardly 19 and is then formed into the arc-shaped parallelogram support-grip 20, the free end of the wire 16 being fastened at 21 by any suitable means.

The two members thus described are similar to each other, except that the support grip 20 is slightly smaller than the support grip 14, thus allowing the former to pass through the latter, thus facilitating the folding of the device when not in use and disconnected from the pipe 22.

A threaded bolt 23 passes through the loops 12 and 18 and is maintained in position by the nut 24, thus forming a pivotal connection between the two described members.

A fastening member comprises the wire 25, one end 26 of which is looped within the loop 17 and the other end of which is formed into a hook 27. The length of the fastening member 25 is such that it will not normally reach the loop 11 of the member 10, when the device is employed upon a support, or pipe, of the smallest desired diameter, and hence in order to insert the hook 27 into the loop 11 it is necessary to bend the members 10 and 16 toward each other thus firmly attaching the support grips to the support.

I prefer to have the length of the fastening member 25 such that the hook 27 will not quite reach the loop 11 when the support grips 14 and 20 practically touch each other, but it is evident that this length can be increased without going beyond the scope of my invention.

The method of applying my device is as follows: The hook 27 is disengaged from the loop 11, the members 10 and 16 are moved apart until the support grips 14 and 20 encompass a support, which may be of any convenient character but which is shown as a pipe, the members 10 and 16 are then moved toward each other and the hook 27 is inserted within the loop 11. As previously explained, the fastening member 25 is so short that considerable stress must be exerted upon the members 10 and 16 to allow of the insertion of the hook 27 into the loop 11, thus securely fastening the support-grips to the support, and preventing their movement thereon when articles are suspended from the members 10, 16 and 25.

In Figure 5, I show a modified form 28 of the member 10 having a plurality of arc-shaped recesses 29, 29, into which the hook 27 may be inserted in order to firmly attach the device to varying sizes of supports, the member 28 carrying the loop 30 corresponding to loop 11 of member 10.

The support-grips 14 and 20 may be of the same size, if desired, in which event the device cannot be folded so compactly as shown in Figure 4.

The device can also be made of flat material, instead of round wire, the support grips 14 and 20 may be flat instead of arc-shaped for use upon plane surfaces, and they may be of shapes other than parallelograms.

My invention, therefore, presents a simple, convenient and inexpensive device for the suspension of articles, capable of attachment to either vertical or horizontal supports of varying character.

I do not limit myself to the particular size, shape, number, or arrangement of parts as shown and described, as these are given simply as a means for clearly describing the device of my invention.

What I claim is:—

1. In a suspending device, in combination, two pivotally connected flexible members, a support grip carried by each flexible member, said support grips being capable of reciprocal movement with respect to each other, and a fastening member adapted to connect the two extended ends of the flexible members, said fastening member being pivotally carried by one of said flexible members and being of such length as to flex the flexible members when said support grips abut upon a support.

2. In a suspending device, in combination, two pivotally connected flexible members, an arc-shaped support-grip carried by each flexible member, said support-grips being capable of reciprocal movement with respect to each other, and a fastening member adapted to connect the two extended ends of the flexible members, said fastening member being pivotally carried by one of said flexible members and being of such length as to flex the flexible members when said support-grips abut upon a support.

3. In a suspending device, in combination, two pivotally connected flexible members, a support grip carried by each flexible member, said support-grips being capable of reciprocal movement with respect to each other, and a fastening means carried by one said flexible member and adapted to engage the other said flexible member, said fastening member being of such length as to flex the flexible members when said support-grips abut upon a support.

4. In a suspending device, in combination, two pivotally connected flexible members, an arc-shaped support-grip carried by each flexible member, said support-grips being capable of reciprocal movement with respect to each other, and a fastening means carried by one said flexible member and adapted to engage the other said flexible member, said fastening member being of such length as to flex the flexible members when said support grips abut upon a support.

5. In a suspending device, in combination, two pivotally connected flexible members, a parallelogram shaped support grip carried by each flexible member, said support grips being capable of reciprocal movement with respect to each other, and a fastening member adapted to connect the two non-grip ends of the flexible members, said fastening member being pivotally carried by one of said flexible members of such length as to flex the flexible members when said support grips abut upon a support.

6. In a suspending device, in combination, two pivotally connected flexible members, an arc-shaped parallelogram support grip carried by each flexible member, said support grips being capable of reciprocal movement with respect to each other, and a fastening member adapted to connect the two non-grip ends of the flexible members, said fastening member being pivotally carried by one of said flexible members of such length as to flex the flexible members when said support grips abut upon a support.

7. In a suspending device, in combination, two pivotally connected flexible members, an arc-shaped parallelogram support grip carried by each flexible member, said support grips being capable of reciprocal movement with respect to each other, and a fastening means carried by one said flexible member and adapted to engage the other said flexible member, said fastening member being of such length as to flex the flexible members when said support grips abut upon a support.

Signed at New York city in the county of New York and State of New York this 5th day of September, 1930.

WILLIAM H. ROSE.